United States Patent [19]

Young

[11] Patent Number: 4,509,503

[45] Date of Patent: Apr. 9, 1985

[54] SOLAR HEATING SYSTEM

[76] Inventor: James E. Young, Box 1052, Alamosa, Colo. 81101

[21] Appl. No.: 483,638

[22] Filed: Apr. 11, 1983

[51] Int. Cl.³ .............................................. F24J 3/02
[52] U.S. Cl. .................................. 126/452; 126/430; 126/431; 126/436; 126/437; 165/47; 165/45; 237/69
[58] Field of Search ............... 126/428, 429, 430, 431, 126/432, 435, 436, 437, 452, 417, 400; 165/485, 49, 47 A, 45; 237/69

[56] References Cited

U.S. PATENT DOCUMENTS

| | | |
|---|---|---|
| 4,018,213 | 4/1977 | Mann .................................. 126/431 |
| 4,051,999 | 10/1977 | Granger et al. ................. 126/431 X |
| 4,061,129 | 12/1977 | Wilson ................................ 126/429 |
| 4,227,566 | 10/1980 | Stilber ............................ 126/431 X |
| 4,248,212 | 2/1981 | Stevens ........................... 126/417 X |
| 4,280,480 | 7/1981 | Raposo .............................. 126/429 |
| 4,289,117 | 9/1981 | Butcher ............................. 126/436 |
| 4,303,058 | 12/1981 | Chun ................................. 126/430 |
| 4,305,381 | 12/1981 | Misrahi et al. ...................... 126/430 |
| 4,313,420 | 2/1982 | Poesch ............................... 126/429 |
| 4,383,521 | 5/1983 | Bounds ............................... 126/430 |

FOREIGN PATENT DOCUMENTS

| | | | |
|---|---|---|---|
| 137844 | 10/1979 | Japan ................................. 126/437 |
| 31735 | 2/1982 | Japan ................................. 126/431 |
| 207754 | 12/1982 | Japan ................................. 126/437 |

Primary Examiner—Margaret A. Focarino
Attorney, Agent, or Firm—Klaas & Law

[57] ABSTRACT

A solar heating system for supplementary heat in a building and preheating a supply of domestic water which collects significant quantities of heat at low temperatures to provide an efficient system which minimizes heat loss. A water preheating system is disposed within a larger solar enclosure to provide higher temperatures to preheat water with high efficiency. The structure of the building, i.e. the basement or crawl space, is used to store heat, thereby eliminating the need for bulky heat storage devices and reducing capital investment. High efficiency is afforded by the low temperature differentials which significantly reduce radiant heat loss.

23 Claims, 18 Drawing Figures

SOLAR HEATING SYSTEM

BACKGROUND OF THE INVENTION

The present invention relates generally to solar heating systems, and more particularly to a combination solar heating system for supplementing building heat and preheating a supply of domestic hot water.

With the advent of higher utility prices, the use of solar energy systems has become more attractive. In general, solar energy systems can be classified in two groups, i.e., active and passive systems.

Active solar energy systems are capable of supplying a large portion of the energy required to operate a building, and thereby substantially reduce utility costs. Additionally, active systems can be easily retrofitted on existing buildings, normally without the need for major structural changes. However, the initial capital cost involved with installing an active solar energy system is normally very substantial. The capital expense of active solar energy systems results, in part, from use of expensive, high temperature collectors. Also, greater heat transfer occurs across large temperature differentials, such as those produced in active solar collectors. Consequently, not only are conventional active high temperature solar energy systems more expensive, they are generally less efficient due to the high heat transfer resulting from high temperature differentials. Similarly, maintenance and upkeep costs of active solar systems can be very high depending upon the system utilized. Therefore, although active systems are capable of providing a large portion of the energy needs of a building, active systems are less efficient and the cost involved with initial capital expenditures and maintenance and upkeep result in a long payback period.

Passive systems, on the other hand, require less capital expense to implement and less maintenance and upkeep than active solar energy systems and are generally more efficient due to the low temperature heat collected. However, passive systems normally cannot be easily retrofitted to existing buildings without major structural changes resulting in large capital expenditures. Additionally, passive systems normally supply a small percentage of the energy needs of a building in comparison to active systems and require large, bulky and awkward heat storage devices. Consequently, passive systems normally do not reduce utility costs in the same manner as active solar energy systems, and similarly result in a long payback period.

Therefore, it would be advantageous to provide a system which could be retrofitted to existing buildings to supply a large percentage of the energy requirements of the building without the need for large, bulky and awkward passive storage devices, as well as a system which is highly efficient in operation, requires low maintenance and upkeep, and low initial capital expense.

OBJECTS OF THE INVENTION

It is, therefore, an object of the present invention to provide an improved solar energy system.

It is also an object of the present invention to provide an improved solar energy system which can be retrofitted to existing buildings.

Another object of the present invention is to provide a solar energy system which is capable of supplying a large percentage of the energy to heat a building.

Another object of the present invention is to provide a solar energy system which is capable of providing a large percentage of the energy to preheat a supply of domestic hot water.

Another object of the present invention is to provide a solar energy system which does not require large bulky passive solar storage devices.

Another object of the present invention is to provide a solar energy system which is highly efficient in operation.

Another object of the present invention is to provide a solar energy system which requires low maintenance and upkeep.

Another object of the present invention is to provide a solar energy system which requires a low initial capital expense.

Another object of the present invention is to provide a combination solar energy system for preheating a supply of domestic hot water and supplementing heat in a building.

Another object of the present invention is to provide a solar heating system for supplementing the heat in a building and preheating a supply of domestic hot water by collecting significant quantities of heat at low temperatures so as to minimize heat loss and maximize efficiency of the solar heating system.

Another object of the present invention is to provide a method of supplementing a building heating system and preheating a supply of domestic hot water in an efficient and inexpensive manner using a solar energy system.

Additional objects, advantages and novel features of the invention are set forth in part in the description which follows and will be understood by those skilled in the art upon examination of this application or may be learned by practice of the invention. The objects and advantages of the invention may be realized and obtained by means of the instrumentalities and combinations particularly pointed out in the appended claims.

SUMMARY OF THE INVENTION

To achieve the foregoing and other objects and in accordance with the purposes of the present invention, as embodied and broadly described herein, the apparatus of this invention may comprise a combination solar energy system for preheating a supply of domestic hot water and supplementing heat in a building comprising: solar enclosure means for collecting large quantities of low temperature heated air; an air space within the building having a structure capable of storing heat provided by the low temperature heated air; duct means for delivering the low temperature heated air to the airspace and for returning air from the airspace to the solar enclosure means; solar concentration collector means disposed within the solar enclosure to collect high temperature heated air within the solar enclosure; phase change heat storage means for storing high temperature heat provided by the high temperature heated air; and heat transfer means connected to the supply of domestic hot water for transferring the high temperature heat from the phase change heat storage means to the supply of domestic hot water to preheat the domestic hot water.

The present invention may also comprise a solar heating system for supplementing the heat in a building and preheating a supply of domestic water by collecting significant quantities of heat at low temperatures so as to minimize heat loss and maximize efficiency of the solar heating system, the solar heating system comprising: an insulated airspace located beneath a floor structure of the building which is capable of storing low temperature heat for substantial periods in structure surrounding the insulated airspace; solar enclosure means for collecting solar energy to heat air to a temperature which is greater than the ambient temperature of the surrounding environment but sufficiently low to minimize heat loss to the surrounding environment; air delivery duct means for delivering heated air from the solar enclosure means to an insulated airspace to supply a substantial amount of low temperature heat to the insulated airspace to supplement building heat by release of the low temperature heat through the floor structure from material and structure surrounding the insulated airspace for a substantial period of time; air return duct means for delivering air from the insulated airspace to the solar enclosure means; forced air imparting means for forcing heated air from the solar enclosure means to the insulated airspace and from the insulated airspace to the solar enclosure means; water preheating means for preheating the supply of domestic water in a closed loop solar heating system disposed in the solar enclosure means comprising: a solar concentration collector; phase change heat storage means for storing heat collected by the solar concentration collector at temperatures greater than the air contained within the solar enclosure; and heat transfer means for transferring heat from the phase change heat storage means to the supply of domestic water.

The present invention may also comprise a method of supplementing a heating system of a building and preheating a supply of domestic hot water for said building in an efficient and inexpensive manner using a solar energy system comprising the steps of: collecting solar heated air in a solar enclosure at temperatures below approximately 100° F.; utilizing existing structure within said building to store heat from said solar heated air with high efficiency resulting from low heat loss due to a low temperature differential between the solar heated air and surrounding ambient temperature; collecting high temperature solar heated air within a concentrated solar heat collector disposed in said solar enclosure; preheating the supply of domestic hot water with the high temperature solar heated air collected by the concentrated solar heat collector.

The advantages of the present invention are that it can be retrofitted to existing buildings to provide a large percentage of the energy to heat a supply of hot water and heat a building without the need for large bulky and awkward passive storage devices and with high efficiency, low maintenance and upkeep, and low initial capital expense. The resulting solar energy system has a short payback period and significantly reduces utility costs.

BRIEF DESCRIPTION OF THE DRAWINGS

An illustrative and presently preferred embodiment of the invention is shown in the accompanying drawings wherein.

DETAILED DESCRIPTION OF THE INVENTION

Figure 1:
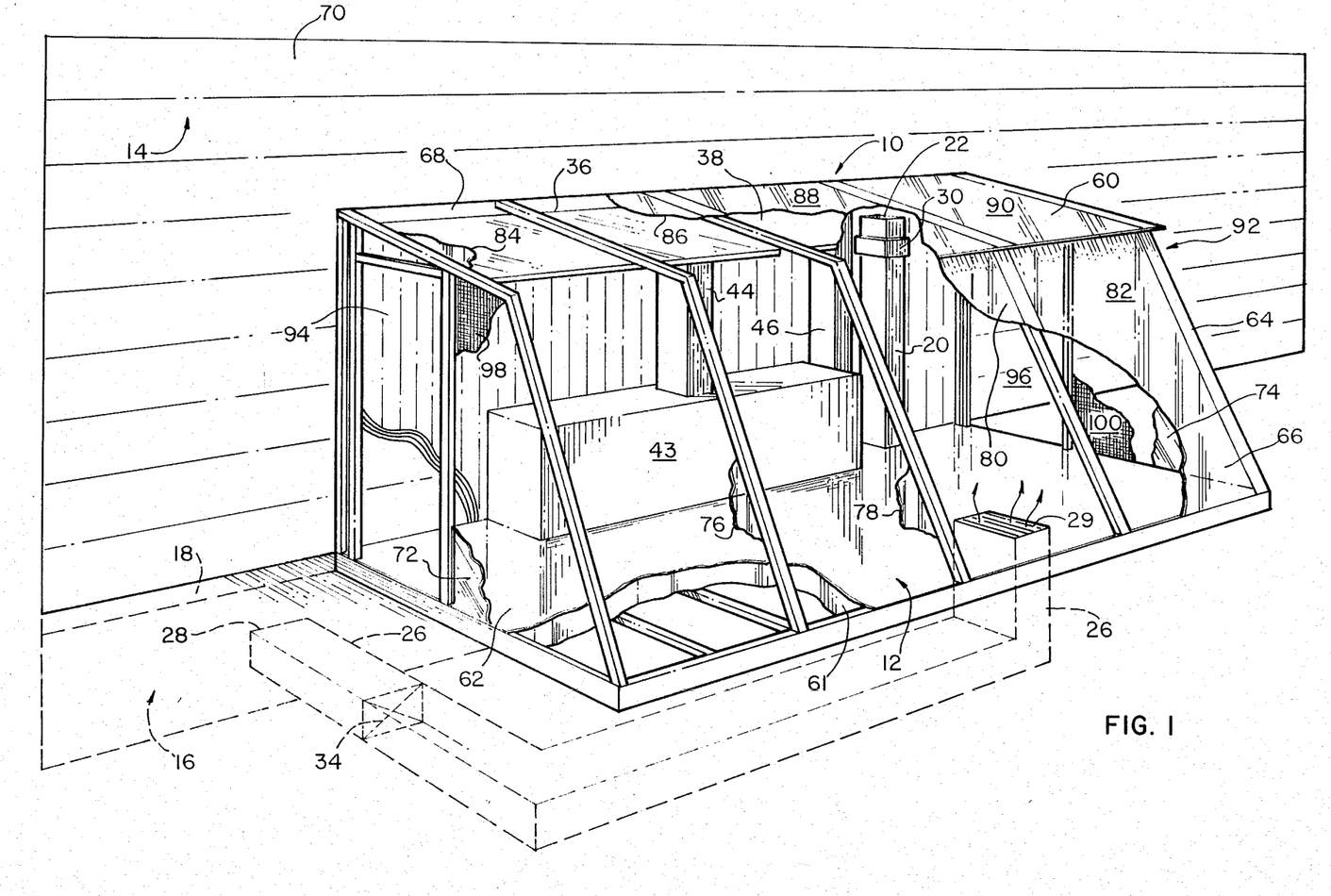
FIG. 1 is a schematic perspective view of a solar heating system incorporating the concepts of the present invention.
Figure 2:
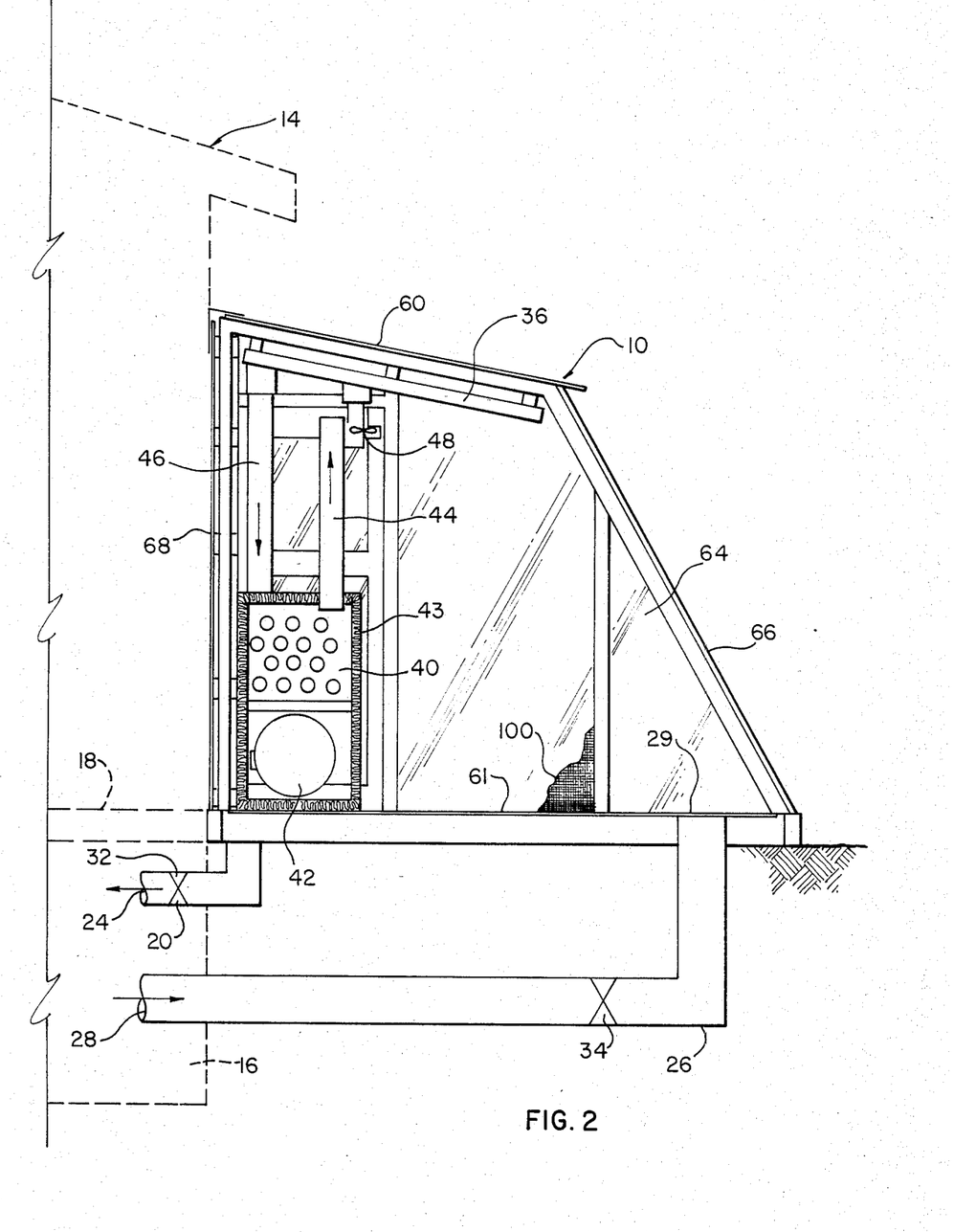
FIG. 2 is a cross-sectional view of the system shown in FIG. 1.

Referring to FIGS. 1 and 2, generally, the solar heating system of the present invention comprises solar enclosure means 10 which is an enclosed insulated solar heated building structure defining an interior space 12 associated with a conventional building structure 14 having an insulated airspace comprising a basement, crawl space, etc. 16 located beneath a conventional floor structure 18. Air delivery duct means 20 has an air inlet opening 22 located at the upper portion of the solar heated space 12 and an air outlet opening 24 in an insulated airspace 16 of a basement, crawl space, etc. of building structure 14. Air return duct means 26 has an inlet opening 28 also located in the insulated airspace 16 of building structure 14 and an outlet opening 29 at a lower portion of the solar heated space 12. Forced air imparting means 30, which can comprise a forced air fan or blower, is associated with air delivery duct means 20 to force the flow of solar heated air from solar heated space 12 to the basement or crawl space area 16 while also causing return flow of cooled air from insulated airspace 16 through air return duct means 26 to the lower level portion of solar heated air space 12. Antiback draft shutter means 32, 33 and 34 are provided in duct means 20, 44 and 26. Solar concentration collector means 36, 38 are mounted within solar heated airspace 12 adjacent to the roof structure of solar enclosure means 10. A phase change heat storage means 40 is mounted within the solar enclosure means 10 directly above heat transfer means 42. A high temperature air delivery duct 46 and a high temperature air return duct 44 connect solar concentration collector means 36, 38 to phase change heat storage means 40. A forced air fan 38 is associated with the high temperature return duct 44 to force heated air from the solar concentration collector means 36, 38 through the phase change heat storage means 40, and return air from the phase change heat storage means 40 to the solar concentration collector means 36, 38.

Solar enclosure means 10 comprises a roof portion 60, a floor portion 61, opposite end wall portion 62, 64, an outer side wall portion 66 and an inner side wall portion 68 which may be a portion of an exterior facing side wall 70 of a preexisting building 14. The roof portion 60, the outer side wall portion 66 and the end wall portion 62, 64 are made from panels 72, 74, 76, 78, 80, 82, 84, 86, 88, 90 of translucent material such as the double skinned acrylic material illustrated which is ⅜ in. thick marketed by CR/YO Industries, W. Main Street., Bound Brook, N.J. 08805, as Exolite having an insulation factor of approximately R 1.8. The panels are mounted in a suitable frame structure 92. One or more heavy duty storm type access doors 94, 96 are provided in end wall portions 62, 64. Removable and replaceable screen sections 98, 100 are provided in end wall portions 62, 64 to enable circulation of air when outside ambient temperatures are sufficiently high to obviate the need for use of the solar heating system. Back wall portion 68 is preferably of a relatively dark, non-reflecting color and could also be made of solar heat collecting panels. Roof portion 60 may be horizontal or have a slight inclination, e.g., 26°, to reduce reflectance. Outer wall portion 66 may be downwardly and outwardly inclined up to 30° or may also be vertical. Floor portion 61 may be of any suitable material such as dirt, concrete, or wood with, or without carpet, or some other cover material so long as the solar heated space 12 is essentially closed relative to the atmosphere. Water preheating means comprise solar concentration collector means 36, 38, phase change heat storage means 40 and heat transfer means 42. Phase change heat storage means 40 comprises a composite material of sodium sulphate decahydrate heat storage salt which undergoes a phase change at approximately 90° F. The eutectic salt utilized in phase change heat storage means 40 absorbs or releases 50 BTU per pound when melting or freezing. This yields a storage capacity of 28,000 BTU at 90° F. If the eutectic salt is brought to the melting temperature of 90° F. and there is no additional solar input, the eutectic salt is capable of heating 84 gallons of water from 50° F. to 90° F., which is equivalent to 1.05 days of water for an average family. This is calculated as follows: 28,000 BTU/(40° F.×8.33 BTU/gal °F.)=84 gallons. The eutectic salts are stored in 4 inch diameter PVC tubes within an outer enclosure 43 which is insulated.

Heat transfer means 42 preferably comprises a 40 gallon water preheating tank with aluminum fins for enhanced heat transfer. The preheating water tank is connected to a supply of domestic water which is coupled to the standard water heating system of the building which may comprise a standard hot water tank. Assuming that 80 percent of the collected energy is used for water preheating, the heat contribution is $2.07 \times 10^7$ BTU/year. If an average family uses 80 gallons of hot water per day, and the water is solar heated from 50° to 90°, the heat required is 8.33 BTU/gal °F×80 gallons/day×365 days/year×50° F. which equals $1.22 \times 10^7$ BTU. This indicates that the water preheating means is capable of producing $2.07 \times 10^7$ BTU/$1.22 \times 10^7$ BTU which is equal to 1.7, or 70% more heat than required for preheating 80 gallons of hot water per day from 50° F. to 90° F.

Figure 3:
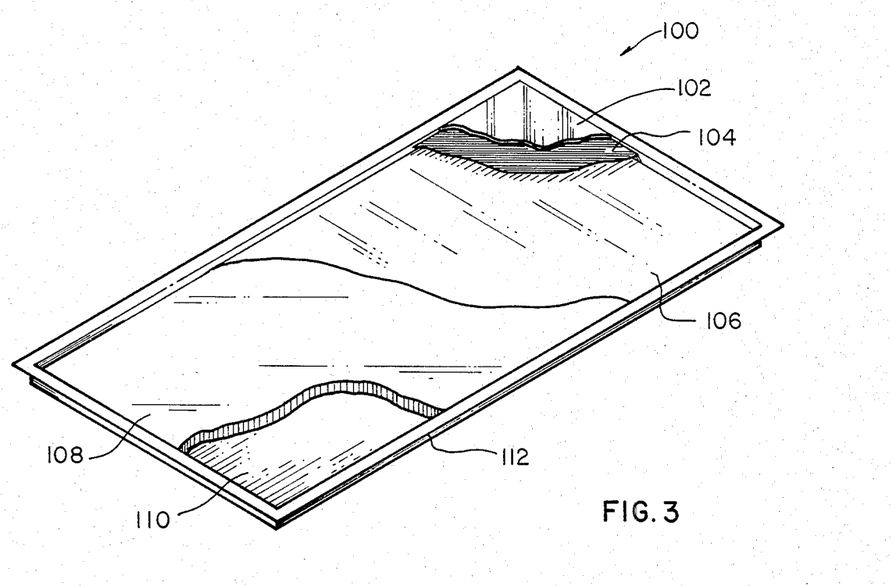
FIG. 3 is a schematic perspective view of the solar concentration means illustrated in FIG. 1.

Referring to FIG. 3, the solar concentration collector means 100, preferably comprises a single 3/16 in. tempered glass glazing 102 and a 5 mil aluminum absorber sheet 104 painted with a wrought iron flat black paint. There is a one inch airspace provided by a 22 gage steel supporting member 112 which is insulated to R-4 with one inch fiberglass ductboard 108. A 0.005 inch aluminum long wave reflector 106 is mounted directly above ductboard 108. Backing member 110 comprises a 29 gage galvanized steel sheet.

Operating the solar concentration collector within the solar enclosure 10 with an approximately 25° temperature differential results in an average collection efficiency of approximately 80%. If operated outside the solar enclosure means 10, efficiency of the solar concentration collector means would be approximately 30%. Consequently, higher temperatures can be achieved with much greater efficiency since the water preheating means is located within the solar enclosure means 10. In this manner, the high temperatures required to preheat water, due to its high specific heat, can be attained with high efficiency.

Figure 4:
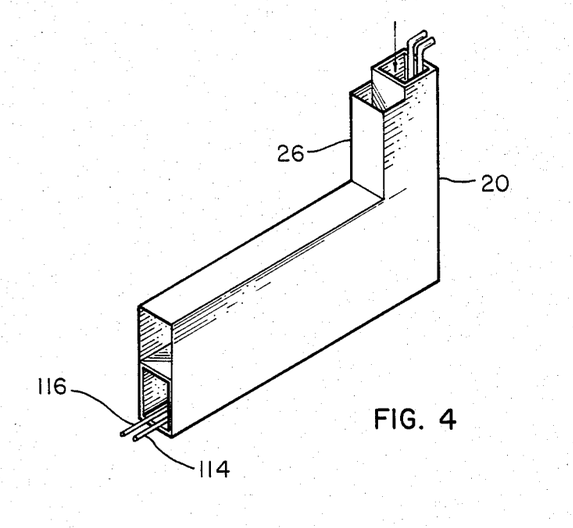
FIG. 4 is a schematic perspective view of a portion of an air duct illustrated in FIG. 1.

Referring to FIG. 4, air delivery duct means 20 and air return duct means 26 are more clearly shown. As illustrated in FIG. 4, a supply of domestic water is coupled from the building structure through a supply of domestic hot water 114 to heat transfer means 42. Return water is also coupled through a return 116 placed within air delivery duct means 20. The water return 116 is connected directly to the hot water heating supply of the building and comprises a supply of preheated domestic hot water.

In operation, air within the solar enclosure means 10 is heated by available solar energy passing through the translucent roof and side wall portions. The heated air is forced into an insulated airspace such as a basement or crawl space or other area to be heated. The heated air causes the material surrounding the basement or crawl space to absorb and retain heat while also maintaining the air in the space at an elevated temperature. The ground in a crawl space area and the floor and walls in a basement become heated and act as a heat sink. The building floor structure above the heated space also absorbs heat and acts as a heat sink. The building floor structure radiates heat upwardly into the building space above the floor when the building temperature drops below the floor temperature. Heated air in the crawl space or basement also acts as a heat sink and remains at relatively high temperature levels for long periods of time. When effective amounts of solar energy are not available, air circulation is terminated and air ducts are closed to keep air at an elevated temperature trapped in the basement or crawl space. Room temperature above the floor is ordinarily approximately 5° below the temperature of the air in the basement or crawl space. Implementation has shown that heated air in the basement and the crawl space retains substantial amounts of heat for substantial periods of time. For example, when air reaches a temperature of 85° during daylight hours at ambient average atmospheric temperatures of 50° F., over a six hour period of time between 10 A.M. and 4 P.M., the temperature of the air decreases to approximately 65° to 70° F. between 4 P.M. and 10 A.M. at ambient outside temperatures of 30° F. Thus, the temperature of the room above the floor is maintained between 60° F. and 65° F. during that period of time. Since the heated air in the basement or crawl space is under pressure, it flows into the building structure through the floor and utility openings therein to increase the air pressure above the floor to prevent entry of colder outside atmospheric air into the building.

The water preheating means operates by collecting radiant energy through the ceiling of the solar enclosure means 10. Concentration collector means 36, 38 super heats air and blows it through insulated sheet metal ducts 46 into phase change heat storage means 40. Eutectic salts absorb heat provided by the solar concentration collectors 36, 38 causing the eutectic salts to melt. The eutectic salts then provide heat to heat transfer means 42 to preheat a supply of domestic hot water for a substantial period of time during the process of recrystalization. Heat is also absorbed by the heat transfer means 42 for preheating water during the process of heating the eutectic salts to the melting temperature of approximately 90° F. Warm air is then forced from the storage box 43 through duct 44 for reheating in solar concentration collectors 36, 38.

Figure 5:
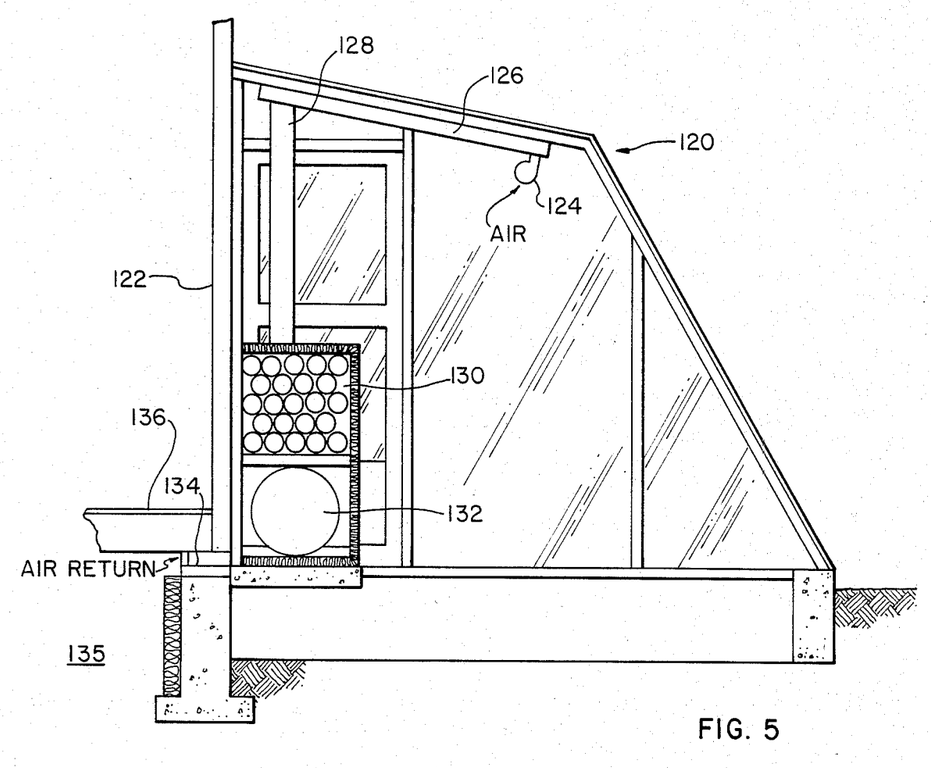
FIG. 5 is a cross-sectional view of an alternative embodiment of the present invention.

FIG. 5 comprises a cutaway cross-sectional view of an alternative embodiment of the present invention. In accordance with the embodiment of FIG. 5, air which is preheated in the solar enclosure 120 is circulated through an input 124 into solar concentration means 126. A duct 128 circulates air heated to a higher temperature in solar concentration collector means 126 to phase change heat storage means 130 to preheat a supply of domestic hot water in heat transfer means 132. After circulation through phase change heat storage means 130, and heat transfer means 132, the heated air is then coupled directly to an insulated airspace 135 beneath a floor structure 136. The building structure of the insulated airspace 135, which can comprise a crawl space or basement, etc., is capable of storing the heat provided by low temperature heated air for substantial periods, in the same manner as disclosed in the embodiment of FIGS. 1 and 2. Air from the insulated airspace is then returned to the solar enclosure means 120 via opening 134.

Figure 6:
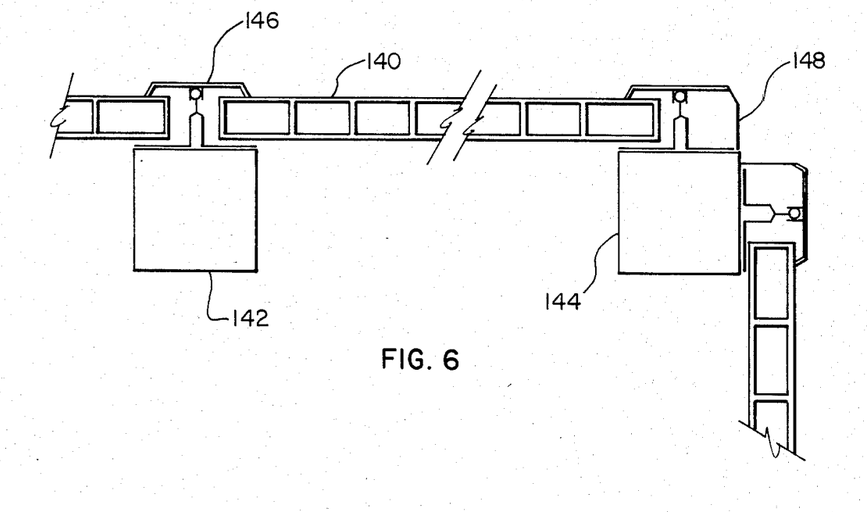
FIG. 6 is a cross-sectional view of the roof section of the solar enclosure means illustrated in FIG. 1.

FIG. 6 discloses a cross-sectional view of the roof section of the solar enclosure means 10 of FIGS. 1 and 2 and solar enclosure means 120 of FIG. 5. A translucent panel 140 which can comprise, for example, a double skinned acrylic translucent panel, such as disclosed above, is attached to steel frame members 142, 144 by polyvinyl chloride ALU Exolite trim member 146 and polyvinyl chloride ALE Exolite trim 148 available from CY/RO Industries as disclosed above. The steel supporting members 142 and 144, as well as the trim members 146 and 148 provide a convenient, inexpensive and durable structure which can be assembled in a short period of time.

Figure 7:
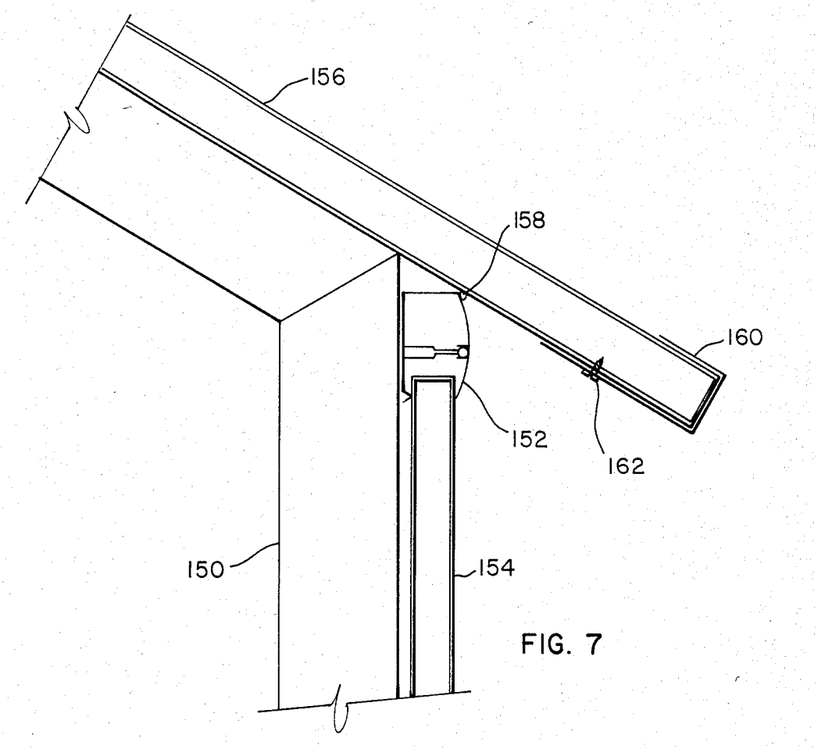
FIG. 7 is a detailed side view of the eave portion of the solar enclosure means illustrated in FIG. 1.

FIG. 7 is a detailed side view of the eave portion of the solar enclosure means. Steel tubing 150 provides a support structure. A polyvinyl chloride ALE aluminum Exolite trim member 152 is attached to the steel tubing member 150 to hold translucent panel 154 in place. Trim member 152 abuts the polyvinyl chloride ALU aluminum T member 156, where a bead of insulation material, such as rubber silicone, is placed for insulation purposes. Metal trim member 160 is riveted to the aluminum T member 156 by way of rivet 162.

Figures 8, 9, 10, 11, 12:
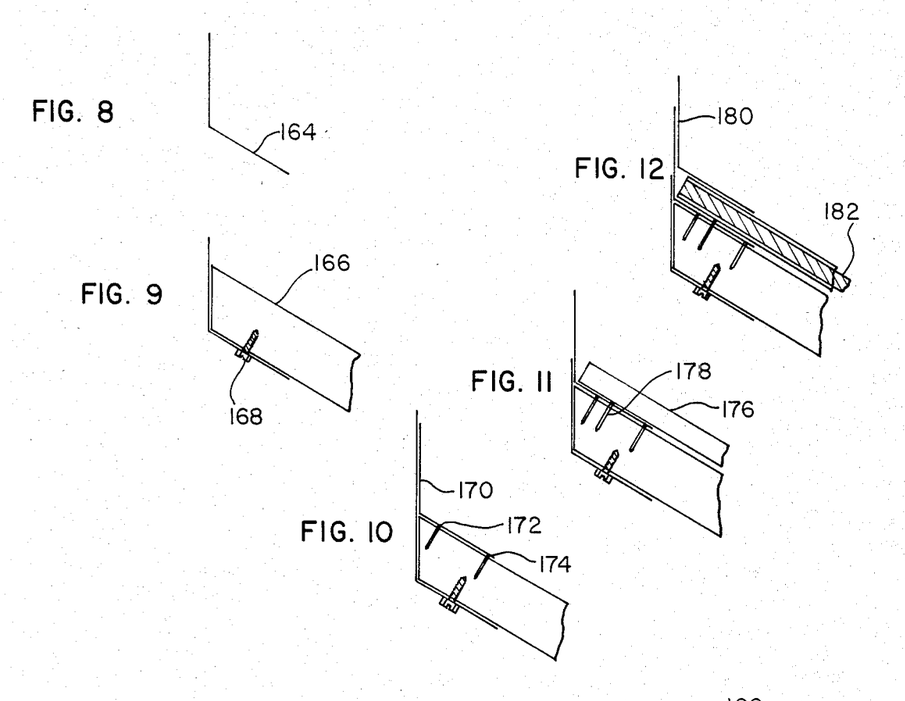
FIGS. 8–12 are a detailed cross-sectional view of the manner in which the solar enclosure means is connected to a building structure.

FIGS. 8–12 disclose a cross-sectional view of the manner of attaching the solar enclosure means 10 to an existing building structure. As shown at FIG. 8, a 22 gage galvanized angle piece is attached to the building structure at the proper height. As disclosed in FIG. 9, a steel tubing frame member 66 is attached to the galvanized angle 164 using a self-tapping screw 168. As shown in FIG. 10, an additional 22 gage galvanized angle 170 is attached to the steel tubing frame with grip rivets 172, 174. As shown in FIG. 11, a polyvinyl chloride Al aluminum T, available from the CY/RO Industries as disclosed above, is attached to the steel frame member through galvanized angle 170 by way of rivet 178. As disclosed in FIG. 12, a rain flashing 180 is attached to the house and to the PVC AL aluminum T with rubber silicone between flashing members. A translucent panel 182 is then attached to the trim piece 176.

Figure 13:
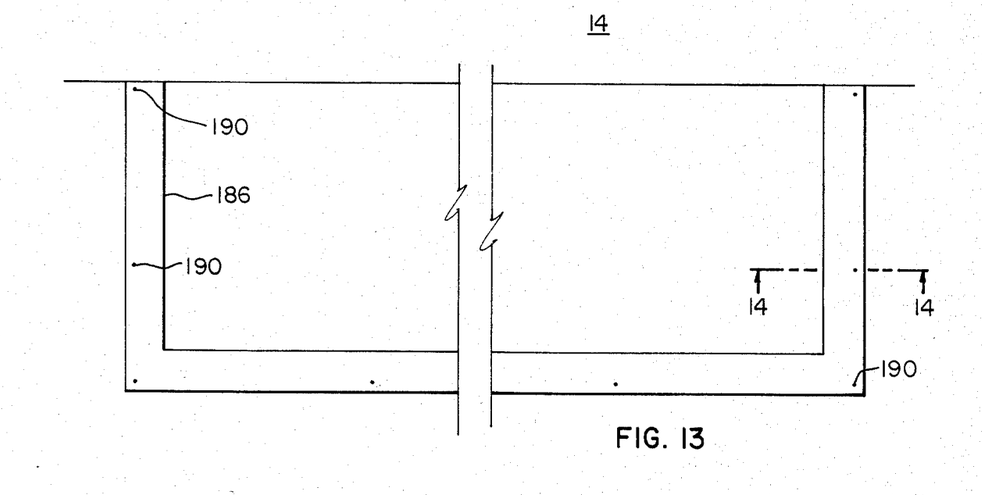
FIG. 13 is a schematic plan view of the foundation for the solar enclosure means illustrated in FIG. 1.
Figure 14:
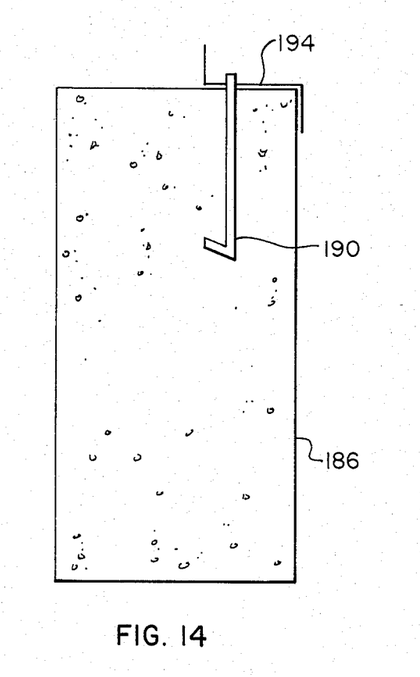
FIG. 14 is a cross-sectional view of the foundation illustrated in FIG. 13.
Figure 15:
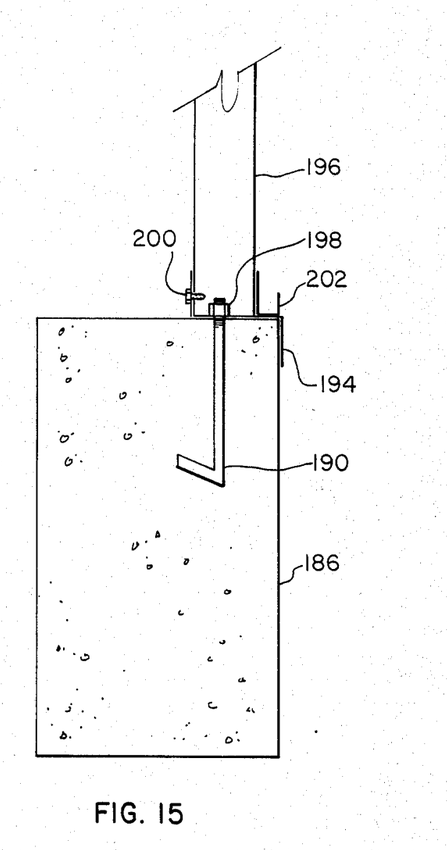
FIG. 15 is a cross-sectional view of the foundation illustrated in FIG. 14 with supporting members attached.

FIG. 13 discloses a plan view of the foundation structure of the device of the present invention. The foundation structure 186 is placed adjacent an existing building structure 14 on the south side of the building. A series of foundation bolts 190 are formed in the foundation structure 186 to attach the solar enclosure means. FIG. 14 discloses a cross-sectional view of the foundation structure illustrated in FIG. 13. A foundation bolt or anchor bolt 190 is embedded within the foundation structure 186 in a predetermined location to attach a 22 gage 3-inch galvanized Z member 194. As illustrated in FIG. 15, bolt 198 attaches the galvanized Z 194 to the foundation member 186 when threaded upon anchor bolt 190. The steel frame member 196 of the solar enclosure means 10 is attached to the galvanized Z member by way of self-tapping screw 200. A J flashing 202 is installed after all steel frame members are secured in position.

Figure 16:
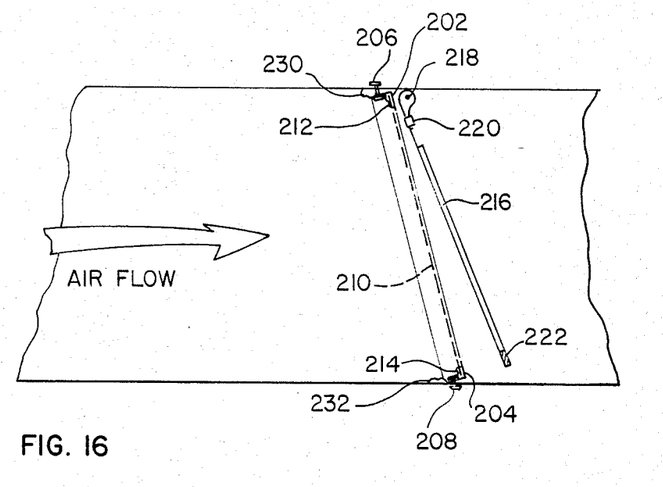
FIG. 16 is a cross-sectional schematic diagram of an antiback draft shutter.
Figure 17:
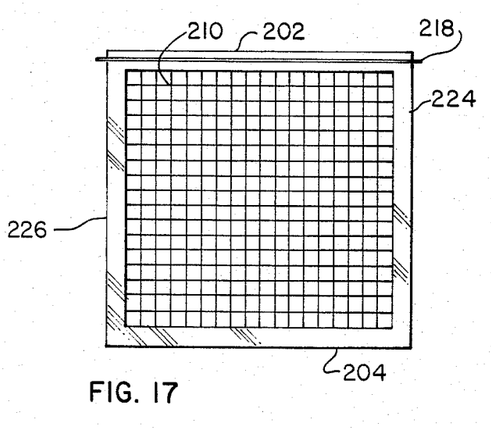
FIG. 17 is a front view of the supporting structure of the antiback draft shutter illustrated in FIG. 16.

FIG. 16 is a cross-sectional schematic diagram of a side view of an antiback draft shutter such as antiback draft shutters 32, 33 and 34 utilized in the present invention. As shown in FIG. 16, angle irons 202 and 204 are riveted to the duct by way of rivets 206 and 208. Similar angle irons 224 and 226 are disposed and riveted to the side portions of the duct as illustrated in FIG. 17. Rubber silicone seals 230 and 232, illustrated in FIG. 16, are disposed between the angle irons and the duct to form an air tight seal. A ½ galvanized metal mesh screen 210, commonly known as hardware cloth, is attached to the angle iron frame by way of rubber silicone 212 and 214. The galvanized mesh 210 functions to support a 5 mil plastic sheet 216 which is looped around a thin wire rod 218 extending the entire horizontal distance of the duct. The plastic sheet 216 is stapled together by staples 220 to form a hinge around wire rod 218. The magnetic strip 222 is disposed along the bottom and side portion of the plastic sheet 216 to magnetically attach the plastic sheet 216 to the angle iron frame.

FIG. 17 is a front view of the supporting structure of the antiback draft shutter illustrated in FIG. 16. As shown in FIG. 17, an angle iron frame comprising angle irons 202, 204, 224 and 226 is attached to the interior surface of the duct at an inclined angle, such as illustrated in FIG. 16. Wire mesh 210 is attached to the back of the angle iron frame by way of a rubber silicone adhesive. Wire rod 218 extends along the entire horizontal distance and is supported by the duct.

Figure 18:
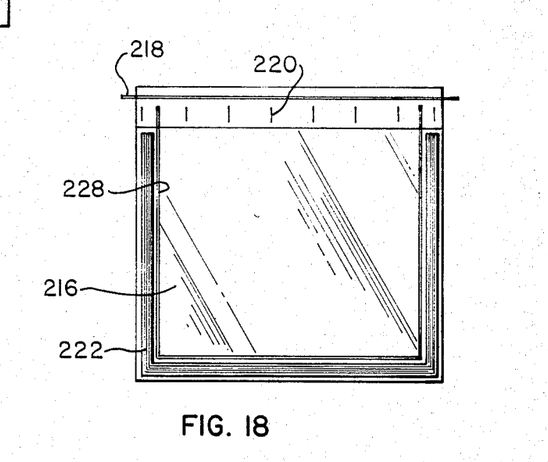
FIG. 18 is a front view of the shutter portion of the antiback draft shutter illustrated in FIG. 16.

FIG. 18 is a schematic front view of the shutter portion of the antiback draft shutter illustrated in FIG. 16. As shown in FIG. 18, plastic sheet 216 is supported by wire rod 218. Additionally, wire reinforcement 228 is adhesively attached to the plastic sheet 216 to provide support during movement. Wire rod 218 is approximately ⅛" in diameter while wire reinforcement 228 is approximately 1/16" in diameter. Magnetic strip 222 is adhesively attached to the peripheral portion of plastic sheet 216 as illustrated in FIG. 18.

In operation, air flow is imparted in the direction illustrated in FIG. 16 having sufficient pressure to break the magnetic seal provided between magnetic strip 222 and the angle iron frame, comprising angle irons 224, 226 and 204. Pressure against the surface of plastic sheet 216 causes the plastic sheet 216 to be raised to allow air to flow as shown. Wire supporting structure 228 ensures that the plastic sheet 216 maintains its shape. The weight of plastic sheet 216 and the magnetic force imparted by magnetic strip 222 are sufficient to block the flow of air in the forward direction until fan 30 imparts a flow rate which is capable of breaking the magnetic seal. Consequently, the antiback draft damper provides an air seal to prevent the flow of air in the forward direction whenever fan 30 is off.

When air flows in a direction opposite to that indicated in FIG. 16, air pressure imparted against plastic sheet 216 causes the plastic sheet to rest against wire mesh 210 and magnetic strip 222 forms a seal with the metal supporting structure. Consequently, a unidirectional flow of air is provided by the antiback draft shutter illustrated in FIGS. 16 through 18.

The present invention therefore provides a unique solar heating system for supplementing the heat in a building and preheating a supply of domestic water by collecting significant quantities of heat at low temperatures so as to minimize heat loss and maximize efficiency of the solar heating system. The solar energy system of the present invention comprises a solar collection system within a larger solar collection system. This allows for the collection of high temperature heated air to preheat a supply of domestic hot water with very high efficiency using a collecting medium (hot air) which will not result in frozen collectors and consequently, reduces maintenance cost. The low temperature differential between the water preheating system and the solar enclosure means provides for high efficiency. Additionally, the low temperature differential between the solar enclosure means and the ambient outside temperature also provides for high efficiency and low heat loss. Additionally, the present invention can be retrofitted to existing structures and does not require expensive and space consuming heat storage devices. Rather, the existing structure of the building is utilized to store heat for long periods of time with high efficiency. The present invention enables the user to employ the existing structure of the building to store heat in an efficient manner, thereby significantly reducing initial capital cost. High efficiency of the present invention is afforded by the low heat loss resulting from the low temperature differentials utilized.

The foregoing description of the invention has been presented for purposes of illustration and description. It is not intended to be exhaustive or to limit the invention to the precise form disclosed, and other modifications and variations may be possible in light of the above teachings.

For example, the present invention can be implemented as a self-contained unitized system which is free-standing and consequently not attached to an existing structure. The advantages of using a free-standing system are that foundations for such a system can be mass produced in a factory from steel or other suitable material and transported to the desired location for assembly. Additionally, free-standing units can be used with existing structures that do not have south walls which are suitable for solar structures because of the proximity to property lines, a change in the original building design, etc. Also, by using a free-standing structure which is separate from the existing structure, building code requirements are more lenient, thereby further reducing the overall cost of the system. Consequently, in certain situations it may be less costly and more practical to employ free-standing systems.

The embodiments were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

The invention claimed is:

1. A combination solar energy system for preheating a supply of hot water and supplementing heat in a building comprising:
   solar enclosure means for collecting large quantities of low temperature heated air;
   an air space within said building having a structure capable of storing heat provided by said low temperature heated air;
   duct means for delivering said low temperature heated air to said airspace and for returning air from said airspace to said solar enclosure means;
   solar concentration collector means disposed within said solar enclosure to collect high temperature heated air within said solar enclosure;
   phase change heat storage means for storing high temperature heat provided by said high temperature heated air; and
   heat transfer means connected to said supply of hot water for transferring said high temperature heat from said phase change heat storage means to said supply of hot water to preheat said hot water.

2. The combination solar energy system of claim 1 wherein said solar enclosure means has solar transmission panels formed from a double skinned acrylic.

3. The combination solar energy system of claim 1 wherein said airspace comprises a crawl space beneath said floor structure.

4. The combination solar energy system of claim 1 wherein said airspace comprises a basement beneath said floor structure.

5. The combination solar energy system of claim 1 wherein said phase change heat storage means comprises eutectic salts.

6. The combination solar energy system of claim 1 wherein said heat transfer means comprises a hot water preheat tank.

7. The combination solar energy system of claim 1 wherein said duct means are coupled underground to said airspace and have antiback draft shutters.

8. The combination solar energy system of claim 1 wherein said supply of water is coupled to said heat transfer means through said duct means.

9. The combination solar energy system of claim 1 wherein said low temperature heated air has a temperature less than approximately 100° F.

10. A solar heating system for supplementing the heat in a building by collecting significant quantities of heat at low temperatures so as to minimize heat loss and maximize efficiency of said solar heating system, said solar heating system comprising:
   an insulated airspace located beneath a floor structure of said building which is capable of storing low temperature heat for substantial periods in structure surrounding said insulated airspace;
   solar enclosure means for collecting solar energy to heat air to a temperature which is greater than the ambient temperature of the surrounding environment but sufficiently low to minimize heat loss to said surrounding environment;

air delivery duct means for delivering heated air from said solar enclosure means to said insulated airspace to supply a substantial amount of low temperature heat to said insulated airspace to supplement building heat by release of said low temperature heat through said floor structure from material and structure surrounding said insulated airspace for a substantial period of time;

air return duct means for delivering air from said insulated airspace to said solar enclosure means;

forced air imparting means for forcing heated air from said solar enclosure means to said insulated airspace and from said insulated airspace to said solar enclosure means;

water preheating means for preheating a supply of water for use in the building in a closed loop solar heating system disposed in said solar enclosure means comprising:

a solar concentration collector;

phase change heat storage means for storing heat collected by said solar concentration collector at temperatures greater than said air contained within said solar enclosure; and heat transfer means for transferring heat from said phase change heat storage means to said supply of water.

11. The solar heating system of claim 10 further comprising antiback draft shutter means for ensuring unidirectional air flow in said air delivery duct means and said air return duct means.

12. The solar heating system of claim 11 wherein said antiback draft shutter means comprises:

a plastic sheet;

a structure for supporting said plastic sheet;

magnetic means attached to said plastic sheet to provide a predetermined sealing force of said plastic sheet with a metal sealing surface.

13. The solar heating system of claim 10 wherein said solar enclosure means has solar transmission panels formed from a double skinned acrylic.

14. The solar heating system of claim 10 wherein said insulated airspace comprises a crawl space beneath said floor structure.

15. The solar heating system of claim 10 wherein said insulated airspace comprises a basement beneath said floor structure.

16. The solar heating system of claim 10 wherein said phase change heat storage means comprises eutectic salts.

17. The solar heating system of claim 10 wherein said heat transfer means comprises a hot water preheat tank.

18. The solar heating system of claim 10 wherein said air delivery duct means and said air return duct means are coupled underground to said insulated airspace.

19. The solar heating system of claim 10 wherein said supply of water is coupled to said water preheating means through said air delivery duct means.

20. The solar heating system of claim 10 wherein said low temperature heat comprises heated air having a temperature less than approximately 100° F.

21. A method of supplementing a heating system of a building and preheating a supply of hot water for use in said building in an efficient and inexpensive manner using a solar energy system which can be retrofitted to an existing building comprising the steps of:

collecting solar heated air in a solar enclosure at temperatures below approximately 100° F.;

utilizing existing structure within said building to store heat from said solar heated air with high efficiency resulting from low heat loss due to a low temperature differential between said solar heated air and surrounding ambient temperature;

collecting high temperature solar heated air within a concentrated solar heat collector disposed within said solar enclosure;

preheating said supply of hot water with said high temperature solar heated air collected by said concentrated solar heat collector;

storing said concentrated solar heat in a phase change heat storage device; and transferring heat from said phase change heat storage device to said supply of hot water.

22. A method of supplementing a heating system of a building and preheating a supply of hot water for use in said building in an efficient and inexpensive manner using a solar energy system which can be retrofitted to an existing building comprising the steps of:

collecting solar heated air in a solar enclosure at temperatures below approximately 100° F.;

utilizing existing structure within said building to store heat from said solar heated air with high efficiency resulting from low heat loss due to a low temperature differential between said solar heated air and surrounding ambient temperature;

collecting high temperature solar heated air within a concentrated solar heat collector disposed within said solar enclosure;

preheating said supply of hot water with said high temperature solar heated air collected by said concentrated solar heat collector; and wherein said step of utilizing an existing structure comprises utilizing a lower level air space in said building to store solar heat.

23. A method of supplementing a heating system of a building and preheating a supply of hot water for use in said building in an efficient and inexpensive manner using a solar energy system which can be retrofitted to an existing building comprising the steps of:

collecting solar heated air in a solar enclosure at temperatures below approximately 100° F.;

utilizing existing structure within said building to store heat from said solar heated air with high efficiency resulting from low heat loss due to a low temperature differential between said solar heated air and surrounding ambient temperature;

collecting high temperature solar heated air within a concentrated solar heat collector disposed within said solar enclosure;

preheating said supply of hot water with said high temperature solar heated air collected by said concentrated solar heat collector; and wherein said step of utilizing an existing structure comprises utilizing a crawl space in said building to store solar heat.

* * * * *